US009232384B2

(12) United States Patent
Chen et al.

(10) Patent No.: US 9,232,384 B2
(45) Date of Patent: Jan. 5, 2016

(54) METHOD, APPARATUS, AND COMPUTER PROGRAM PRODUCT FOR ADAPTIVE DEVICE DISCOVERY IN WIRELESS NETWORKS

(75) Inventors: Canfeng Chen, Beijing (CN); Jia Liu, Beijing (CN)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 14/401,525

(22) PCT Filed: Jun. 1, 2012

(86) PCT No.: PCT/CN2012/076382
§ 371 (c)(1),
(2), (4) Date: Nov. 16, 2014

(87) PCT Pub. No.: WO2013/177792
PCT Pub. Date: Dec. 5, 2013

(65) Prior Publication Data
US 2015/0133054 A1    May 14, 2015

(51) Int. Cl.
*H04B 7/00*      (2006.01)
*H04W 8/00*      (2009.01)
*H04W 4/00*      (2009.01)
*H04W 74/00*     (2009.01)

(52) U.S. Cl.
CPC .............. *H04W 8/005* (2013.01); *H04W 4/008* (2013.01); *H04W 74/002* (2013.01)

(58) Field of Classification Search
CPC ..... H04W 4/008; H04W 84/18; H04W 48/10; H04W 40/244; H04W 48/16; H04W 8/005
USPC ................................. 455/41.2, 41.3
See application file for complete search history.

(56) References Cited

U.S. PATENT DOCUMENTS

| | | | |
|---|---|---|---|
| 2008/0220746 | A1 | 9/2008 | Ekberg |
| 2010/0056054 | A1* | 3/2010 | Yamato et al. ............... 455/41.2 |
| 2011/0021142 | A1* | 1/2011 | Desai et al. .................. 455/41.2 |
| 2013/0010960 | A1* | 1/2013 | Ho et al. ....................... 380/270 |
| 2013/0090061 | A1* | 4/2013 | Linde ............................ 455/41.2 |
| 2013/0235166 | A1* | 9/2013 | Jones et al. ..................... 348/51 |

FOREIGN PATENT DOCUMENTS

| | | |
|---|---|---|
| CN | 102378365 | 3/2012 |
| WO | 2012042045 | 4/2012 |

OTHER PUBLICATIONS

International Search Report and Written Opinion received for corresponding Patent Cooperation Treaty Application No. PCT/CN2012/076382, dated Mar. 7, 2013, 11 pages.

* cited by examiner

*Primary Examiner* — Nay A Maung
*Assistant Examiner* — Angelica M Perez
(74) *Attorney, Agent, or Firm* — Nokia Technologies Oy

(57) ABSTRACT

Method, apparatus, and computer program product example embodiments enable wireless communication devices to reduce connection latency in high device population environments. In example embodiments, a method is disclosed for creating, at an apparatus, operating parameters for a wireless data channel connection and descriptive information regarding a time interval available to the apparatus for transmission of advertising channel messages and a count of a number of previous transmissions of the advertising channel messages to reduce connection latency in high device population environments; transmitting, by the apparatus, one or more wireless advertising channel messages indicating presence of the data channel connection, the operating parameters associated with the data channel connection, and the descriptive information regarding the time interval available for transmission of advertising channel messages and the count of the number of previous transmissions of the advertising channel messages; and transmitting information on the data channel connection according to the operating parameters.

22 Claims, 8 Drawing Sheets

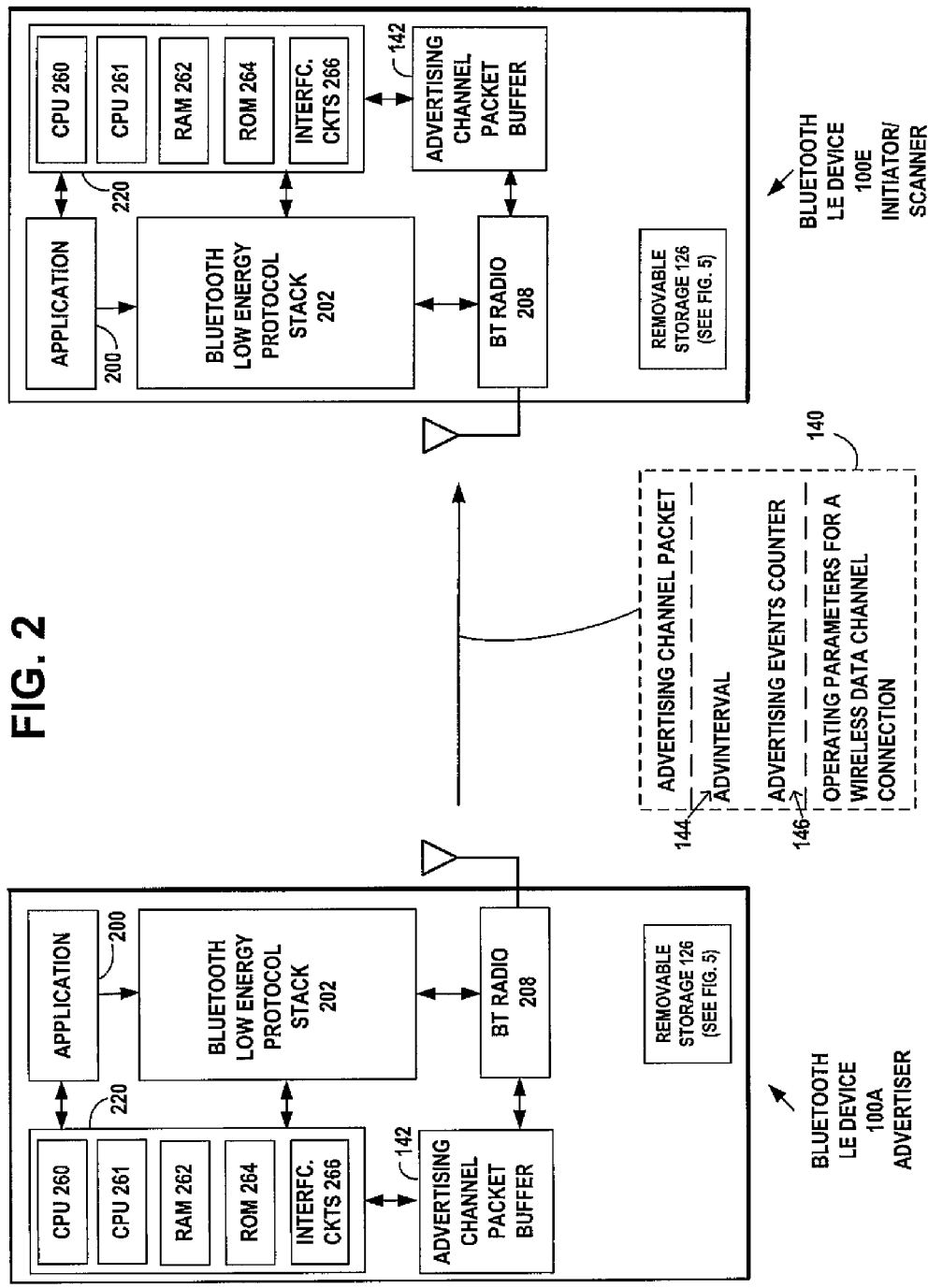

METHOD, APPARATUS, AND COMPUTER PROGRAM PRODUCT FOR ADAPTIVE DEVICE DISCOVERY IN WIRELESS NETWORKS

RELATED APPLICATION

This application was originally filed as PCT Application No. PCT/CN2012/076382 filed Jun. 1, 2012.

FIELD

The field of the invention relates to wireless communication and more particularly to device discovery in wireless communication networks.

BACKGROUND

Perhaps the best-known example of wireless personal area network (PAN) technology is Bluetooth Standard, which operates in the 2.4 GHz ISM band. Bluetooth is a short-range radio network, originally intended as a cable replacement. Bluetooth Technical Specifications are published by the Bluetooth SIG, Inc. *Bluetooth Specification version 2.0+EDR*, published Oct. 15, 2004 has the original functional characteristics of the first version Bluetooth Basic Rate (BR) and adds the Enhanced Data Rate (EDR) feature. *Bluetooth Specification version 2.1+EDR*, published Jul. 26, 2007 for Basic Rate/Enhanced Data Rate (BR/EDR), added definitions for new features: Encryption Pause Resume, Erroneous Data reporting, Extended Inquiry Response, Link Supervision Timeout Event, Packet Boundary Flag, Secure Simple Pairing, Sniff Subrating. *Bluetooth Specification version 3.0+ HS*, published Apr. 21, 2009, updated the standard to integrate the Alternate MAC/PHY and Unicast Connectionless Data features.

On Apr. 20, 2009, Bluetooth SIG presented the new Bluetooth Low Energy protocol. Bluetooth Low Energy (LE) is a communication protocol directed to optimize power consumption of devices while being connected to other devices. The Bluetooth Low Energy packets include a preamble used for radio synchronization, an access address used for physical link identification, a shorter protocol data unit (PDU) to carry the payload data and the PDU header information, and a cyclic redundancy code (CRC) to ensure correctness of the data in the PDU.

On Jun. 30, 2010, the Bluetooth SIG published the *Bluetooth Core Specification, Version* 4.0 (incorporated herein by reference), which includes the Bluetooth Low Energy (LE) protocol for products that require lower power consumption, lower complexity, and lower cost than would be possible using the BR/EDR protocol. Bluetooth LE is designed for applications requiring lower data rates and shorter duty cycles, with a very-low power idle mode, a simple device discovery, and short data packets. Bluetooth LE devices employ a star topology, where one device serves as a master for a plurality of slave devices, the master dictating connection timing by establishing the start time of the first connection event and the slave devices transmitting packets only to the master upon receiving a packet from the master. According to Bluetooth LE communication protocol all connections are point-to-point connections between two devices (the master and the slave).

SUMMARY

Method, apparatus, and computer program product example embodiments enable wireless communication devices to reduce connection latency in high device population environments.

According to an example embodiment of the invention, a method comprises:

creating, at an apparatus, operating parameters for a wireless data channel connection and descriptive information regarding a time interval available to the apparatus for transmission of advertising channel messages and a count of a number of previous transmissions of the advertising channel messages to reduce connection latency in high device population environments;

transmitting, by the apparatus, one or more wireless advertising channel messages indicating presence of the wireless data channel connection, the operating parameters associated with the wireless data channel connection, and the descriptive information regarding the time interval available to the apparatus for transmission of advertising channel messages and the count of the number of previous transmissions of the advertising channel messages; and transmitting, by the apparatus, information on the wireless data channel connection according to the operating parameters.

According to an example embodiment of the invention, a method comprises:

wherein the wireless advertising channel message is transmitted on a Bluetooth Low Energy advertising channel and messages transmitted on the wireless data channel are transmitted on a Bluetooth Low Energy data channel.

According to an example embodiment of the invention, a method comprises:

wherein the wireless advertising channel message includes an advInterval value indicating the time interval available to the apparatus for transmission of advertising channel messages.

According to an example embodiment of the invention, a method comprises:

entering, by the apparatus, a connected state with another device responding to the advertising channel messages; and resetting, by the apparatus, the count of the number of previous transmissions of the advertising channel messages, after the apparatus enters the connected state.

According to an example embodiment of the invention, a method comprises: wherein the operating parameters included in the wireless advertising channel messages enable a receiving device to receive the information transmitted on the wireless data channel connection.

According to an example embodiment of the invention, a method comprises:

receiving, by an apparatus, one or more wireless advertising channel messages that include descriptive information regarding a time interval available to the sender for transmission of advertising channel messages and a count of a number of previous transmissions of the advertising channel messages by the sender to reduce connection latency in high device population environments;

computing a total time interval consumed by the sender in previous transmissions of the advertising channel messages, based on the received descriptive information regarding the time interval available to the sender for transmission of advertising channel messages and the count of the number of previous transmissions of the advertising channel messages by the sender; and adjusting, by the apparatus, an amount of time for receiving advertising channel messages, based on the computed total time interval consumed by the sender in previous transmissions of the advertising channel messages.

According to an example embodiment of the invention, a method comprises:

wherein the amount of time for the apparatus receiving advertising channel messages is based on a scanWindow duration and a scanInterval; and the scanWindow is increased if the computed total time interval is less than the scanInterval and greater than the scanWindow.

According to an example embodiment of the invention, a method comprises:

wherein the amount of time for the apparatus receiving advertising channel messages is based on a scanWindow duration and a scanInterval; and the scanWindow is increased and the scanInterval is decreased if the computed total time interval is greater than the scanInterval.

According to an example embodiment of the invention, a method comprises:

wherein the amount of time for the apparatus receiving advertising channel messages is based on a scanWindow duration and a scanInterval; and either the scanWindow is decreased or the scanInterval is increased if the computed total time interval is less than the scanInterval.

According to an example embodiment of the invention, a method comprises:

wherein the wireless advertising channel message is received on a Bluetooth Low Energy advertising channel and a wireless data channel is a Bluetooth Low Energy data channel.

According to an example embodiment of the invention, an apparatus comprises:

at least one processor;

at least one memory including computer program code;

the at least one memory and the computer program code configured to, with the at least one processor, cause the apparatus at least to:

create operating parameters for a wireless data channel connection and descriptive information regarding a time interval available to the apparatus for transmission of advertising channel messages and a count of a number of previous transmissions of the advertising channel messages to reduce connection latency in high device population environments;

transmit one or more wireless advertising channel messages indicating presence of the wireless data channel connection, the operating parameters associated with the wireless data channel connection, and the descriptive information regarding the time interval available to the apparatus for transmission of advertising channel messages and the count of the number of previous transmissions of the advertising channel messages; and transmit information on the wireless data channel connection according to the operating parameters.

According to an example embodiment of the invention, an apparatus comprises:

wherein the wireless advertising channel message is transmitted on a Bluetooth Low Energy advertising channel and messages transmitted on the wireless data channel are transmitted on a Bluetooth Low Energy data channel.

According to an example embodiment of the invention, an apparatus comprises:

wherein the wireless advertising channel message includes an advInterval value indicating the time interval available to the apparatus for transmission of advertising channel messages.

According to an example embodiment of the invention, an apparatus comprises:

the at least one memory and the computer program code configured to, with the at least one processor, cause the apparatus at least to:

enter a connected state with another device responding to the advertising channel messages; and reset the count of the number of previous transmissions of the advertising channel messages, after the apparatus enters the connected state.

According to an example embodiment of the invention, an apparatus comprises:

wherein the operating parameters included in the wireless advertising channel messages enable a receiving device to receive the information transmitted on the wireless data channel connection.

According to an example embodiment of the invention, an apparatus comprises:

at least one processor;

at least one memory including computer program code;

the at least one memory and the computer program code configured to, with the at least one processor, cause the apparatus at least to:

receive one or more wireless advertising channel messages that include descriptive information regarding a time interval available to the sender for transmission of advertising channel messages and a count of a number of previous transmissions of the advertising channel messages by the sender to reduce connection latency in high device population environments;

compute a total time interval consumed by the sender in previous transmissions of the advertising channel messages, based on the received descriptive information regarding the time interval available to the sender for transmission of advertising channel messages and the count of the number of previous transmissions of the advertising channel messages by the sender; and adjust an amount of time for receiving advertising channel messages, based on the computed total time interval consumed by the sender in previous transmissions of the advertising channel messages.

According to an example embodiment of the invention, an apparatus comprises:

wherein the amount of time for the apparatus receiving advertising channel messages is based on a scanWindow duration and a scanInterval; and the scanWindow is increased if the computed total time interval is less than the scanInterval and greater than the scanWindow.

According to an example embodiment of the invention, an apparatus comprises:

wherein the amount of time for the apparatus receiving advertising channel messages is based on a scanWindow duration and a scanInterval; and the scanWindow is increased and the scanInterval is decreased if the computed total time interval is greater than the scanInterval.

According to an example embodiment of the invention, an apparatus comprises:

wherein the amount of time for the apparatus receiving advertising channel messages is based on a scanWindow duration and a scanInterval; and either the scanWindow is decreased or the scanInterval is increased if the computed total time interval is less than the scanInterval.

According to an example embodiment of the invention, an apparatus comprises:

wherein the wireless advertising channel message is received on a Bluetooth Low Energy advertising channel and a wireless data channel is a Bluetooth Low Energy data channel.

According to an example embodiment of the invention, a computer program product comprising computer executable program code recorded on a computer readable non-transitory storage medium, the computer executable program code comprising:

code for creating, at an apparatus, operating parameters for a wireless data channel connection and descriptive information regarding a time interval available to the apparatus for transmission of advertising channel messages and a count of a number of previous transmissions of the advertising channel messages to reduce connection latency in high device population environments;

code for transmitting, by the apparatus, one or more wireless advertising channel messages indicating presence of the wireless data channel connection, the operating parameters associated with the wireless data channel connection, and the descriptive information regarding the time interval available to the apparatus for transmission of advertising channel messages and the count of the number of previous transmissions of the advertising channel messages; and code for transmitting, by the apparatus, information on the wireless data channel connection according to the operating parameters.

According to an example embodiment of the invention, a computer program product comprising computer executable program code recorded on a computer readable non-transitory storage medium, the computer executable program code comprising:

code for receiving, by an apparatus, one or more wireless advertising channel messages that include descriptive information regarding a time interval available to the sender for transmission of advertising channel messages and a count of a number of previous transmissions of the advertising channel messages by the sender to reduce connection latency in high device population environments;

code for computing a total time interval consumed by the sender in previous transmissions of the advertising channel messages, based on the received descriptive information regarding the time interval available to the sender for transmission of advertising channel messages and the count of the number of previous transmissions of the advertising channel messages by the sender; and code for adjusting, by the apparatus, an amount of time for receiving advertising channel messages, based on the computed total time interval consumed by the sender in previous transmissions of the advertising channel messages.

Accordingly, wireless communication devices may reduce connection latency in high device population environments.

DESCRIPTION OF THE FIGURES

FIG. 2 is an example embodiment of the internal architecture of the Bluetooth LE advertiser device and the Bluetooth LE initiator/scanner device, where the advertiser device transmits the advertising channel packet, that carries to the initiator/scanner devices information about a time interval available to the advertiser device for transmission of advertising channel messages and a count of a number of previous transmissions of the advertising channel messages, in accordance with an example embodiment of the invention.

DISCUSSION OF EXAMPLE EMBODIMENTS OF THE INVENTION

Figure 1A:
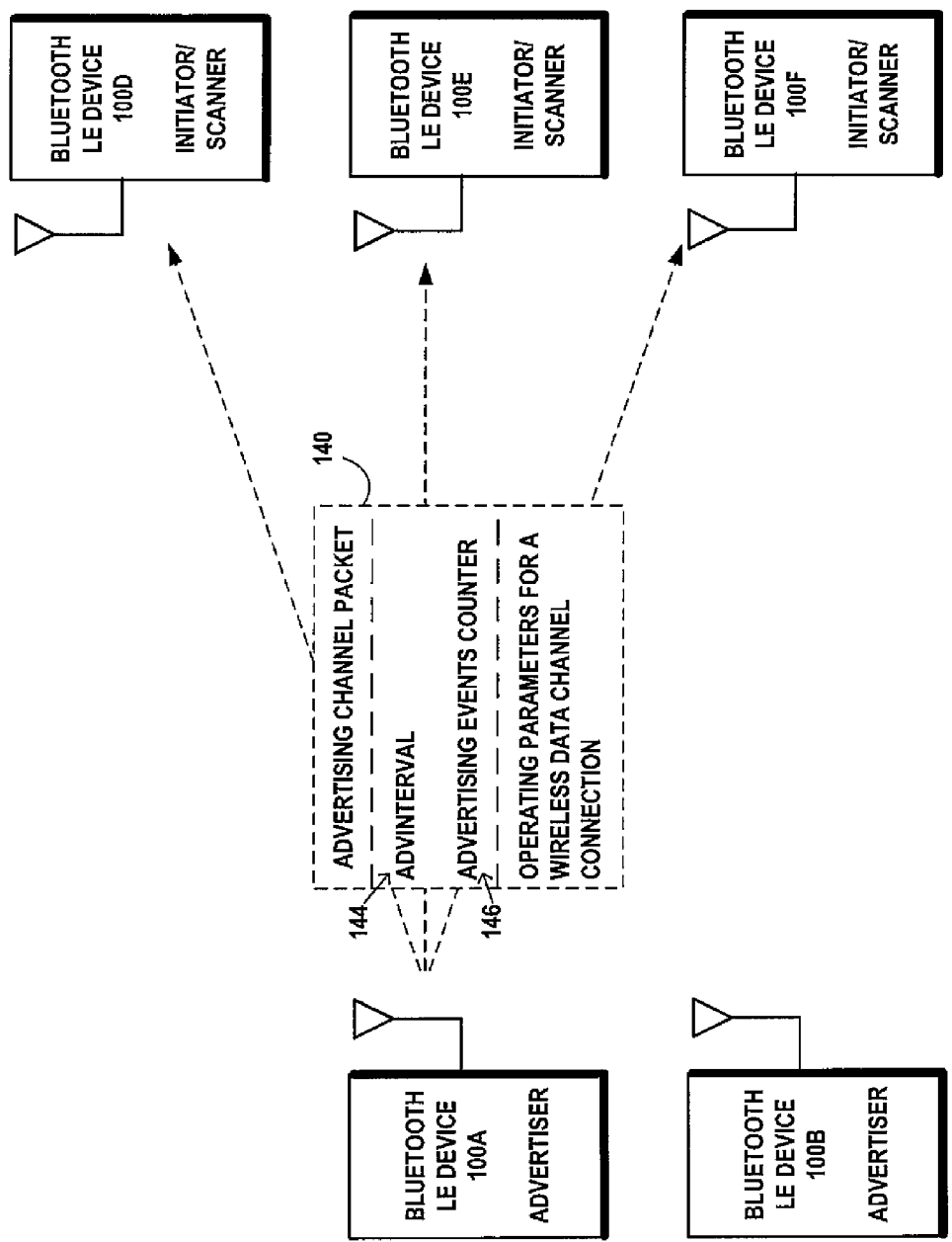
FIG. 1A is an example embodiment of a wireless network using the Bluetooth LE protocol, including first and second Bluetooth LE advertiser devices and first, second, and third Bluetooth LE initiator/scanner devices, where the first advertiser device transmits a new advertising channel packet or protocol data unit (PDU) that carries to the initiator/scanner devices information about a time interval available to the advertiser device for transmission of advertising channel messages and a count of a number of previous transmissions of the advertising channel messages, in accordance with an example embodiment of the invention.

This section is organized into the following topics:

I. Device Discovery In Wireless Short-Range Communication Networks

II. Bluetooth™ Low Energy (LE) Technology

III. Adaptive Device Discovery In Wireless Networks

I. Device Discovery in Wireless Short-Range Communication Networks

Short-range communication technologies provide communication solutions appropriate for many data applications, without the cost, traffic and legislative concerns of longerrange communication technologies. Popular short-range communication technologies include Bluetooth basic rate/enhanced data rate (BR/EDR), Bluetooth Low Energy (LE), IEEE 802.11 wireless local area network (WLAN), Wireless Universal Serial Bus (WUSB), Ultra Wide-band (UWB), Zig-Bee (IEEE 802.15.4, IEEE 802.15.4a), and near field communication technologies, such as radio frequency identification (RFID) and near field communication (NFC) technology that enable contactless identification and interconnection of wireless devices. Bluetooth Low Energy (LE) Technology provides an example of device discovery in wireless short-range communication networks.

II. Bluetooth Low Energy (LE) Technology

The Bluetooth™ Core Specification, Version 4.0 includes the Bluetooth LE protocol for products that require lower power consumption, lower complexity, and lower cost than would be possible using the BR/EDR protocol. Bluetooth LE is designed for applications requiring lower data rates and shorter duty cycles, with a very-low power idle mode, a simple device discovery, and short data packets. Bluetooth LE devices may employ a star topology, where one device serves as a master for a plurality of slave devices, the master dictating connection timing by establishing the start time of the first connection event and the slave devices transmitting packets only to the master upon receiving a packet from the master. According to Bluetooth LE communication protocol all connections are point-to-point connections between two devices (the master and the slave).

The Bluetooth LE protocol allows a star network topology in connections, where one device serves as a master for a plurality of slave devices. The master device dictates the connection timing and communication operations of the one or more slave devices. Bluetooth LE communicates over a total of 40 RF channels, each having a bandwidth of 2 MHz. Data communication between Bluetooth LE devices occurs in 37 pre-specified data channels, of the 40 RF channels. All data connection transmissions occur in connection events wherein a point-to-point connection is established between the master device and a slave device. In the Bluetooth LE protocol, a slave device provides data through Bluetooth LE communication to the master device to which it is connected. The remaining 3 channels, of the 40 RF channels, are advertising channels used by devices to advertise their existence and capabilities. The Bluetooth LE protocol defines a unidirectional connectionless broadcast mode on the advertising channels.

The Link Layer provides a state machine with the following five states: Standby State, Advertising State, Scanning State, Initiating State, and Connection State. The Link Layer state machine allows only one state to be active at a time. The Link Layer in the Standby State does not transmit or receive any packets and can be entered from any other state. The Link Layer in the Advertising State will be transmitting advertising channel packets and possibly listening to and responding to responses triggered by these advertising channel packets. A device in the Advertising State is known as an advertiser. The Advertising State can be entered from the Standby State. The Link Layer in the Scanning State will be listening for advertising channel packets from devices that are advertising. A device in the Scanning State is known as a scanner. The Scanning State can be entered from the Standby State. The Link Layer in the Initiating State will be listening for advertising channel packets from a specific device and responding to these packets to initiate a connection with that specific device. A device in the Initiating State is known as an initiator. The Initiating State can be entered from the Standby State. The Connection State of the Link Layer may be entered either from the Initiating State or the Advertising State. A device in the Connection State is known as being in a connection over a data channel. Within the Connection State, two roles are defined: the Master Role and the Slave Role. When a device in the Initiating State, enters the Connection State, it is in the Master Role, it exchanges data packets with a slave device in a data channel, and it defines the timings of transmissions. When a device in the Advertising State, enters the Connection State, it is in the Slave Role and exchanges data packets with a master device in a data channel, wherein the master device defines the timings of transmissions.

The Bluetooth LE radio operates in the unlicensed 2.4 GHz ISM band, in the same manner as does the Basic Rate/Enhanced Data Rate (BR/EDR) radio. Bluetooth LE supports very short data packets, from 8 octets to a maximum of 27 octets, giving it a low duty cycle. Bluetooth LE employs a frequency hopping transceiver with many frequency hopping spread spectrum (FHSS) carriers, with a bit rate of 1 Megabit per second (Mb/s). Bluetooth LE employs two multiple access schemes: Frequency division multiple access (FDMA) and time division multiple access (TDMA). Forty (40) physical channels, separated by 2 MHz, are used in the FDMA scheme. Three (3) are used as advertising channels and 37 are used as data channels. A TDMA based polling scheme is used in which one device transmits a packet at a predetermined time and a corresponding device responds with a packet after a predetermined interval.

The physical channel is sub-divided into time units known as events. Data is transmitted between Bluetooth LE devices in packets that are positioned in these events. There are two types of events: Advertising and Connection events.

Devices that transmit advertising packets on the advertising Physical Layer (PHY) channels are referred to as advertisers. Devices that receive advertising on the advertising channels without the intention to connect to the advertising device are referred to as scanners. Devices that form a connection to another device by listening for connectable advertising packets, are referred to as initiators. Transmissions on the advertising PHY channels occur in advertising events.

In the Bluetooth™ Core Specification, Version 4.0, there are four advertising event types: connectable undirected advertising (ADV_IND), connectable directed advertising (ADV_DIRECT_IND), scannable undirected advertising (ADV_SCAN_IND), and non-connectable undirected advertising (ADV_NONCONN_IND). At the start of each advertising event, the advertiser sends an advertising packet corresponding to the advertising event type. The header of the advertising channel packet identifies the packet type in a four-bit PDU Type field encoding. There are seven values currently assigned to the four-bit PDU Type field, ranging from 0000 to 0110, with the values 0111 to 1111 being reserved for future use.

The scanner device, also referred to as the initiator device, that receives the advertising packet, may make a connect request (CONNECT_REQ) to the advertiser device on the same advertising PHY channel. The CONNECT_REQ request includes fields for access address AA, CRC, WinSize, WinOffset, Interval, Latency, Timeout, ChannelMap, Hop count, and sleep clock accuracy SCA. The four-bit PDU Type field in the header of the CONNECT_REQ advertising channel packet, is 0101. When the advertiser device accepts the CONNECT_REQ request, a point-to-point connection results between the scanner/initiator device that becomes the master device, and the advertiser device that becomes the slave device in a piconet. The master and the slave devices know at what time and in which frequency the connection is in operation. The data channel changes between every connection event and the start of connection events are spaced regularly with the connection interval that is provided in the CONNECT_REQ packet.

In the connectable undirected advertising (ADV_IND) channel packet, the ADV_IND PDU has a payload field containing AdvA and AdvData fields. The AdvA field contains the advertiser's public or random device address and the AdvData field may contain Advertising data from the advertiser's host. The PDU may be used in connectable undirected advertising events. The four-bit PDU Type field in the header of the ADV_IND advertising channel packet, is 0000.

In the connectable directed advertising (ADV_DIRECT_IND) channel packet, the ADV_DIRECT_IND PDU has the payload field containing AdvA and InitA fields. The AdvA field contains the advertiser's public or random device address. The InitA field is the address of the device to which this PDU is addressed. The InitA field may contain the initiator's public or random device address. The PDU may be used in connectable directed advertising events. This packet may not contain any host data. The four-bit PDU Type field in the header of the ADV_DIRECT_IND advertising channel packet, is 0001.

In a non-connectable undirected event type advertising channel packet, ADV_NONCONN_IND, a scanner device is allowed to receive information in the advertising channel packet, but scanner devices are not allowed to transmit anything in the advertising channels upon receiving the ADV_NONCONN_IND advertising channel packets. When the non-connectable undirected event type is used, non-connectable advertising indications ADV_NONCONN_IND packets are sent by the Link Layer. The non-connectable undirected event type allows a scanner to receive information contained in the ADV_NONCONN_IND from the advertiser. The advertiser may either move to the next used advertising channel index or close the advertising event after each ADV_NONCONN_IND that is sent. The four-bit PDU Type field in the header of the ADV_NONCONN_IND advertising channel packet, is 0010.

In the scannable undirected advertising (ADV_SCAN_IND) channel packet, the ADV_SCAN_IND PDU has the payload field containing AdvA and AdvData fields. The AdvA field contains the advertiser's public or random device address. The PDU may be used in scannable undirected advertising events. The AdvData field may contain Advertising Data from the advertiser's host. The four-bit PDU Type field in the header of the ADV_SCAN_IND advertising channel packet, is 0110.

In the Bluetooth™ Core Specification, Version 4.0, if the advertiser is using a connectable advertising event, a scanner/initiator may make a connection request using the same advertising PHY channel on which it received the connectable advertising packet. The advertising event is ended and connection events begin if the advertiser receives and accepts the request for a connection to be initiated. Once a connection is established, the scanner/initiator becomes the master device in a piconet and the advertising device becomes the slave device. Within a connection event, the master and slave alternate sending data packets using the same data PHY channel.

According to the Bluetooth Specification V4.0, Bluetooth LE device discovery involves different operational processes for devices with different roles. In particular:

Slave Device, being an advertiser, performs an advertising process during which the device repeatedly enters Advertising Events. The interval of each start of Advertising Event, Ta, composes of a fixed-length "advInterval" and a random-length "advDelay". In Advertising Event, the device sends advertising Packet Data Units (PDUs) in broadcasting channel 37, 38 and 39, respectively.

Master Device, being an initiator/scanner, performs the initiating/scanning process. An initiating/scanning process consists of repeated "scanInterval", each of which contains a "scanWindow". In a different "scanWindow", the device changes the RF module to receive the state and listens to advertising PDUs on different broadcasting channels; while out of the "scanWindow", it does routine scheduling, or turns off the RF module.

If any advertising PDU is received by an initiator/scanner, it means the initiator successfully discovers the advertising device. For the initiator, it can directly send back a "CONN_REQ" to establish a connection with that advertiser. For a scanner, it can send out a "SCAN_REQ" to ask for more information from that advertiser.

Example non-limited use cases for Bluetooth LE technology include sports and fitness, security and proximity and smart energy. Bluetooth LE technology is designed for devices to have a battery life of up to one year such as those powered by coin-cell batteries. These types of devices include watches that will utilize Bluetooth LE technology to display Caller ID information and sports sensors that will be utilized to monitor the wearer's heart rate during exercise. The Medical Devices Working Group of the Bluetooth SIG is also creating a medical devices profile and associated protocols to enable Bluetooth applications for Bluetooth LE devices.

A Bluetooth LE advertising channel may be shared by any number of Bluetooth LE devices. Any number of Bluetooth LE devices may transmit advertising packets while sharing the same three advertising PHY channels. In high-density environments, however, since there are a large number of nodes to be discovered, the probability of broadcasting conflict will inevitably increase, causing network access time to increase, and also lowering the energy efficiency of the whole network.

III. Adaptive Device Discovery in Wireless Networks

A Bluetooth LE advertising channel may be shared by any number of Bluetooth LE devices. Any number of Bluetooth LE devices may transmit advertising packets while sharing the same three advertising physical (PHY) channels. In high-density environments, however, since there are a large number of nodes to be discovered, the probability of a broadcasting conflict may increase, causing network access time to increase and lowering the energy efficiency of the whole network.

In an example embodiment of the invention, when there is a large number of Bluetooth LE devices in a network, advertiser devices may include in their advertising packets or protocol data units (PDUs), connection reports that include the time interval available to the sender for transmission of advertising channel messages, referred to herein as the advInterval, and also a count of a number of previous transmissions of the advertising channel messages, referred to herein as the advertising events counter. The initiator/scanner devices that receive these connection reports may fine-tune the initiating/scanning parameters, scanInterval or scanWindow, to adapt to the current network condition and thus efficiently reduce the delay of device discovery. In an example embodiment of the invention, the connection report in an advertising PDU does not impose extra overhead since no new signaling is required. In an example embodiment of the invention, including the connection report in an advertising PDU enables reducing connection latency in high Bluetooth LE device population environments. In an example embodiment of the invention, energy efficiency is improved for both advertiser devices and initiator/scanner devices. In an example embodiment of the invention, implementation is relatively simple to accomplish.

FIG. 1A is an example embodiment of a wireless network using the Bluetooth LE protocol, including Bluetooth LE advertiser devices 100A and 100B and Bluetooth LE initiator/scanner devices 100D, 100E, and 100F, where the advertiser device 100A transmits a new advertising channel packet or protocol data unit (PDU) 140 that carries to the initiator/scanner devices 100D, 100E, and 100F information about a time interval, advInterval 144, available to the advertiser device 100A for transmission of advertising channel messages and a count, advertising events counter 146, of a number of previous transmissions of the advertising channel messages 140, in accordance with an example embodiment of the invention.

In an example embodiment of the invention, the advertiser device 100A creates operating parameters for a wireless data channel connection and descriptive information regarding a time interval, advInterval 144, available to the advertiser device 100A for transmission of advertising channel messages 140 and a count, advertising events counter 146, of a number of previous transmissions of the advertising channel messages.

In an example embodiment of the invention, the advertiser device 100A transmits one or more undirected wireless advertising channel messages 140 indicating presence of the wireless data channel connection, the operating parameters associated with the wireless data channel connection, and the descriptive information regarding the time interval, advInterval 144, available to the apparatus for transmission of advertising channel messages and the count, advertising events counter 146, of the number of previous transmissions of the advertising channel messages.

In an example embodiment of the invention, each initiator/scanner device 100D, 100E, and 100F may scan the advertising channels. If the Bluetooth LE initiator/scanner device 100E, for example, receives an advertising channel packet 140, it computes a total time interval consumed by the sender, advertising device 100A, in previous transmissions of the advertising channel messages 140, based on the received descriptive information regarding the time interval, advInterval 144, available to the advertising device 100A for transmission of advertising channel messages and the count, advertising events counter 146, of the number of previous transmissions of the advertising channel messages by advertising device 100A. The Bluetooth LE initiator/scanner device 100E then adjusts an amount of time for receiving advertising channel messages 140, based on the computed total time interval consumed by advertising device 100A in previous transmissions of the advertising channel messages 140.

In an example embodiment of the invention, the amount of time for the Bluetooth LE initiator/scanner device 100E to receive advertising channel messages 140 is based on a scanWindow duration and a scanInterval. In an example embodiment of the invention, the Bluetooth LE initiator/scanner device 100E may adjust an amount of time for receiving advertising channel messages 140 by increasing the scanWindow if the computed total time interval is less than the scanInterval and greater than the scanWindow. In an example embodiment of the invention, the Bluetooth LE initiator/scanner device 100E may adjust an amount of time for receiving advertising channel messages 140 by increasing the scanWindow and decreasing the scanInterval if the computed total time interval is greater than the scanInterval. In an example embodiment of the invention, the Bluetooth LE initiator/scanner device 100E may adjust an amount of time for receiving advertising channel messages 140 by either decreasing the scanWindow or increasing the scanInterval if the computed total time interval is less than the scanInterval.

Figure 1B:
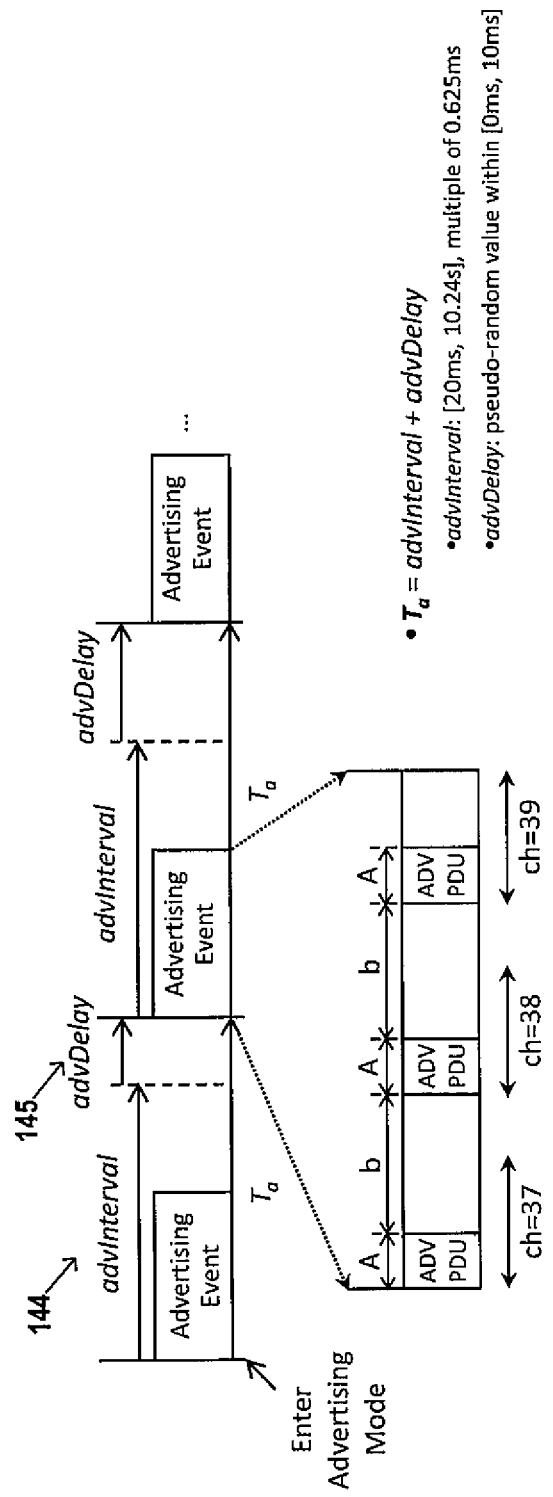
FIG. 1B is an example embodiment of a timing chart for transmission of advertising messages by an advertiser device, wherein the advertiser device repeatedly enters Advertising Events. The interval, Ta, of each Advertising Event, is composed of a fixed-length advInterval and a random-length advDelay. In an Advertising Event, the advertising device sends advertising Packet Data Units (PDUs) in broadcasting channel 37, 38 and 39, respectively, in accordance with an example embodiment of the invention.

FIG. 1B is an example embodiment of a timing chart for transmission of advertising messages 140 by an advertiser device 100, wherein the advertiser device 100A repeatedly enters Advertising Events. The interval, Ta, of each Advertising Event, is composed of a fixed-length advInterval 144 and a random-length advDelay 145. In an Advertising Event, the advertising device 100A sends advertising Packet Data Units (PDUs) 140 in broadcasting channel 37, 38 and 39, respectively, in accordance with an example embodiment of the invention. For all undirected advertising events, the time between the start of two consecutive advertising events (T_advEvent) is computed by T_advEvent=advInterval+advDelay. The advInterval is an integer multiple of 0.625 ms ranging from 20 ms to 10.24 s; the advDelay is a pseudo-random value within a range of 0 ms to 10 ms generated by the Link Layer for each advertising event.

Figure 1C:
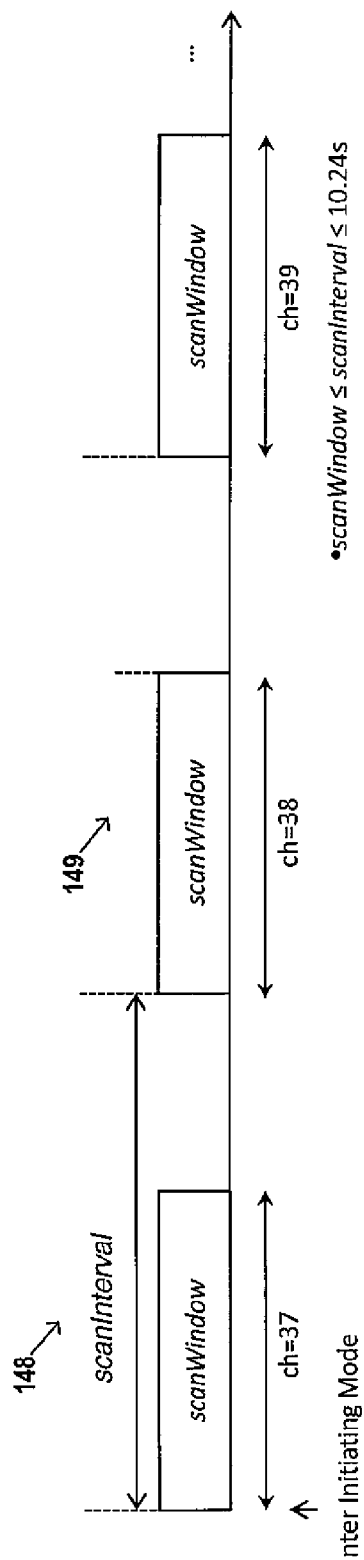
FIG. 1C is an example embodiment of a timing chart for scanning by an initiator/scanner device to discover advertising messages, wherein the initiator/scanner device repeats scanning during a scanInterval, each of which contains a scanWindow. In consecutive scanWindows, the initiator/scanner device changes its RF module to the receive state and listens to advertising PDUs on different broadcasting channels. While outside of the scanWindow, the initiator/scanner device may do routine scheduling, or it may turn off its RF module, in accordance with an example embodiment of the invention.

FIG. 1C is an example embodiment of a timing chart for scanning by an initiator/scanner device 100E to discover advertising messages 140, wherein the initiator/scanner device 100E repeats scanning during a scanInterval 148, each of which contains a scanWindow 149. In consecutive scanWindows 149, the initiator/scanner device 100E changes its RF module to the receive state and listens to advertising PDUs 140 on different broadcasting channels. While outside of the scanWindow 149, the initiator/scanner device 100E may do routine scheduling, or it may turn off its RF module, in accordance with an example embodiment of the invention.

Figure 1D:
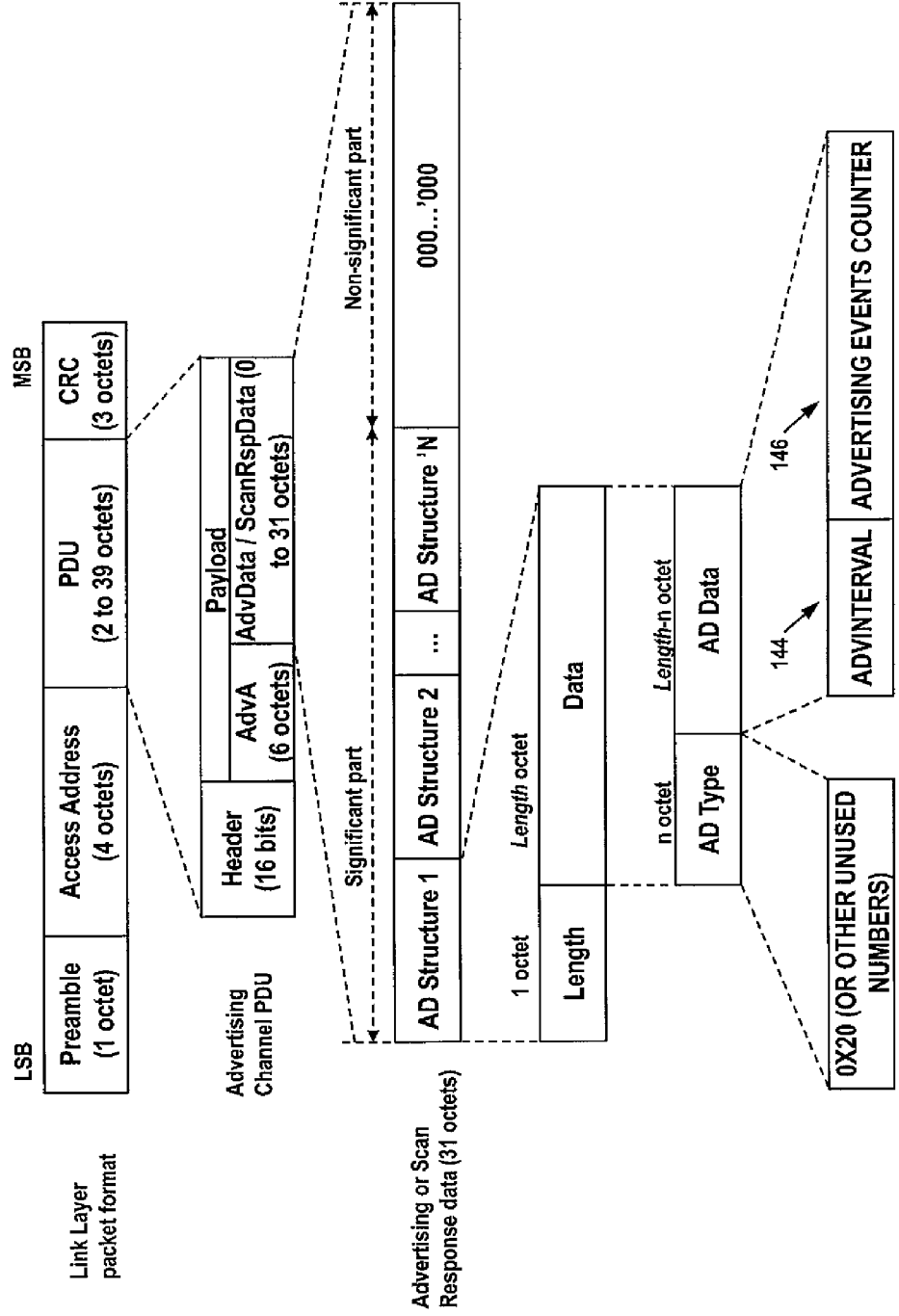
FIG. 1D is an example format of an example advertising channel packet (PDU) that the advertiser device transmits on an advertising channel to the initiator/scanner devices, containing information about a time interval available to the advertiser device for transmission of advertising channel messages and a count of a number of previous transmissions of the advertising channel messages, in accordance with an example embodiment of the invention.

FIG. 1D is an example format of an example advertising channel packet (PDU) 140 that the advertiser device 100A transmits on an advertising channel to the initiator/scanner devices 100D, 100E, and 100F, containing information about a time interval, advInterval 144, available to the advertiser device 100A for transmission of advertising channel messages 140 and a count, advertising events counter 146, of a number of previous transmissions of the advertising channel messages 140, in accordance with an example embodiment of the invention.

The Bluetooth LE link layer has only one packet format used for both advertising channel packets and data channel packets. Each packet consists of four fields: the preamble, the Access Address, the protocol data unit (PDU), and the cyclic redundancy code (CRC). The preamble is 1 octet and the Access Address is 4 octets. The PDU range is from 2 to a maximum of 39 octets. The CRC is 3 octets. The Access Address for all advertising channel packets is hex value 0x8E89BED6.

The preamble and Access Address are followed by a PDU. The advertising channel PDU has a 16-bit header and a variable size payload. A PDU Type field of the advertising channel PDU that is contained in the header, indicates the PDU type. A Length field of the advertising channel PDU header indicates the payload field length in octets, and may be 6 to 37 octets.

In the data format of advertising and scan response shown in FIG. 1D, the advertising data (31 Octets) has two parts: significant part and non-significant part. The significant part carries the advertising data that is encapsulated within multiple AD Structures. Each AD Structure contains a Length field and a Data field, and each Data field further contains AD Type and AD Data.

In an example embodiment of the invention, a new AD type introduces a new Bluetooth Assigned Number. The AD Type field may contain a value 0x20 (or other unused numbers), to indicate a new type of Bluetooth LE advertising packet. The AD Data field contains the advInterval 144 and the advertising events counter 146. The first 2 octets define Adv_interval, the value for the advertising interval in the following manner: Adv_interval=advInterval/0.625 ms; Adv_interval range: 0x0006 to 0x4000. The second 2 octets define the counter of the advertising events since it enters Advertising Mode. The range of the counter: 0x0001 to 0xFFFF (values exceed 0xFFFF are kept with 0xFFFF).

In an example embodiment of the invention, the existing AD type is extended for Manufacturer Specific Data in Bluetooth Assigned Numbers. The first 2 octets contain the Company Identifier Code followed by additional manufacturer specific Data. The second 2 octets define Adv_interval, the value for the advertising interval in the following manner: Adv_interval=advInterval/0.625 ms; Adv_interval range: 0x0006 to 0x4000. The last 2 octet define the counter of the advertising events since it enters Advertising Mode. The range of the counter: 0x0001 to 0xFFFF (values exceed 0xFFFF are kept with 0xFFFF).

In an example embodiment of the invention, each advertiser adds a connection report that contains two fields, advInterval and advertising events counter (since it entered the Advertising Mode), in its advertising PDUs.

In an example embodiment of the invention, if an initiator successfully receives an advertising PDU, it exploits the above information to evaluate the interference situation, and adaptively adjusts the scanInterval or the scanWindow, if necessary.

In an example embodiment of the invention, each time an advertiser enters he Connected State, it clears its counter of the previous advertising events.

In an example embodiment of the invention, advertiser devices may include in their connection reports, an indication of the total duration of time of previous transmissions of advertising channel messages, in addition to or instead of the advInterval and the advertising events counter. Other information may also be included by the advertiser devices in the connection reports, to further reduce connection latency in high Bluetooth LE device population environments.

In an example embodiment of the invention, when the initiator infers a reduction in collisions based on the advertisers' information, or when it detects no advertising PDU 140 for a threshold period of time, it may adjust the scanInterval or the scanWindow again for the purpose of energy-saving.

In an example embodiment of the invention, the initiator uses the connection report it has received from the advertiser device in the following exemplary algorithm:

1. Compute the actual time the advertiser consumed in accessing the initiator:

t=min {((advInterval+avg_delay)*counter), tinitiating},
where advInterval and counter are got from the advertising PDU, avg_delay=5 ms, and tinitiating is locally kept time since each time the initiating started.

2. If scanWindow<t<scanInterval, increase scanWindow.
3. Else if t>scanInterval, increase scanWindow and decrease scanInterval,
4. Else, decrease scanWindow or increase scanInterval.
5. Restart initiating.

In an example embodiment of the invention, the initiator may use other types of algorithms based on the connection reports, for example, the initiator may extend the scanInterval to a value close to the scanWindow value whenever a collision is detected and it may restore the original configuration parameters when no collision is detected.

FIG. 2 is an example embodiment of the internal architecture of the Bluetooth LE advertiser device 100A and the Bluetooth LE initiator/scanner device 100E, where the advertiser device 100A transmits the advertising channel packet 140, that carries to the initiator/scanner devices 100E information about a time interval, the advInterval 144, available to the advertiser device for transmission of advertising channel messages and a count, the advertising events counter 146, of a number of previous transmissions of the advertising channel messages 140, in accordance with an example embodiment of the invention.

The Bluetooth LE advertiser device 100A and the Bluetooth LE initiator/scanner device 100E may be a Bluetooth enabled communications device, PDA, cell phone, laptop or palmtop computer, or the like or it may be a stationary access point, automotive dashboard interface, home electronics interface or other Bluetooth enabled stationary interface or device. The Bluetooth LE advertiser device and the Bluetooth LE initiator/scanner device may be a Bluetooth enabled remote controller, healthcare monitor, sports sensor, token, key fob, watch, wireless keyboard, gaming pad, body sensor, toy, health care equipment, human interface device, entertainment device, wireless microphone, GPS sensor, or the like. The Bluetooth LE advertiser device and the Bluetooth LE initiator/scanner device may include a processor 220, which includes a dual core central processing unit (CPU) 260 and 261, a random access memory (RAM) 262, a read only memory (ROM) 264, and interface circuits 266 to interface with the radio transceiver 208. The Bluetooth LE advertiser device and the Bluetooth LE initiator/scanner device may each further include a battery and other power sources, key pad, touch screen, display, microphone, speakers, ear pieces, camera or other imaging devices, etc. The RAM 262 and ROM 264 may be removable memory devices such as smart cards, SIMs, WIMs, semiconductor memories such as RAM, ROM, PROMS, flash memory devices, etc. according to an embodiment of the present invention. According to an embodiment, the Bluetooth LE advertiser device and the Bluetooth LE initiator/scanner device each include the Bluetooth Low Energy protocol stack 202, which is described in the *Bluetooth Core Specification, Version* 4.0 protocol specification. In an example embodiment of the invention, the first Bluetooth LE advertiser device and the second Bluetooth LE initiator/scanner device may also include a Bluetooth BR/EDR protocol stack, which is described in the *Bluetooth Specification version* 3.0+*HS*.

Figure 5:
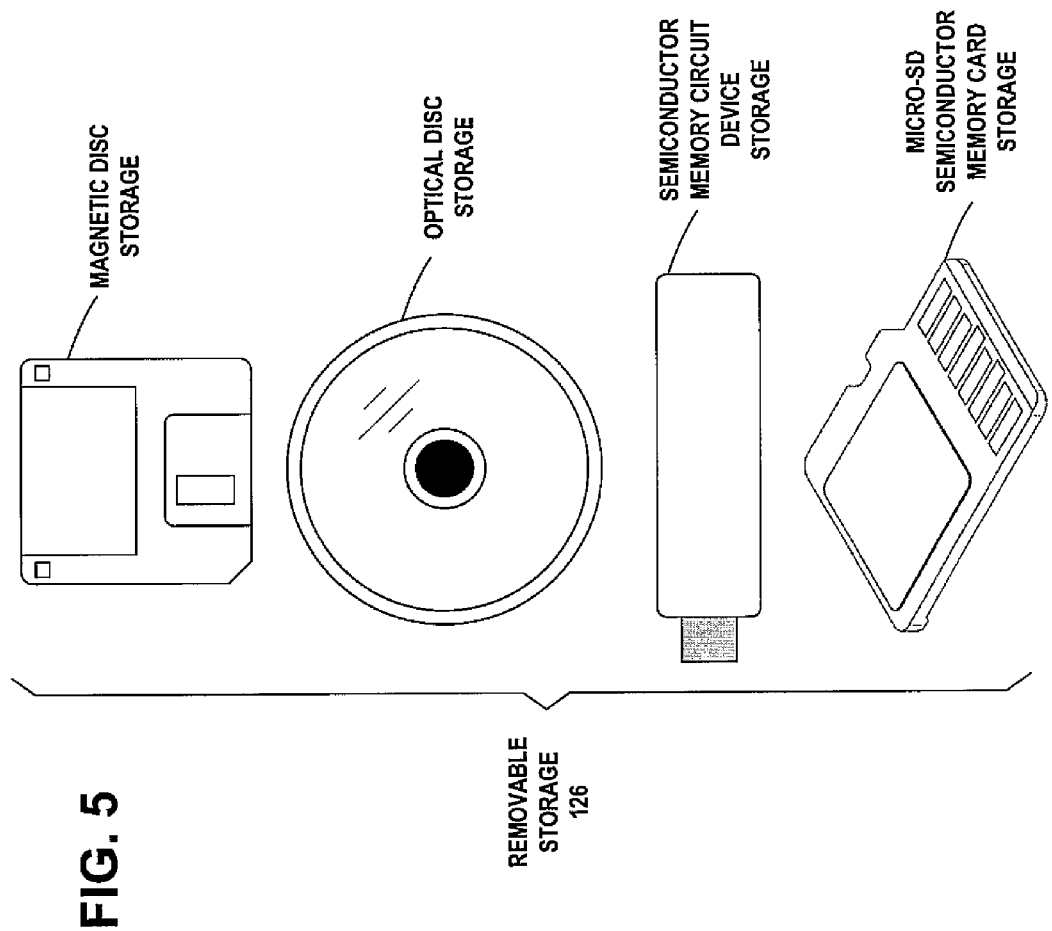
FIG. 5 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with an example embodiment of the invention.

The processor 220, protocol Bluetooth protocol stack 202 and/or application program 200 may be embodied as program logic stored in the RAM 262 and/or ROM 264 in the form of sequences of programmed instructions which, when executed in the CPUs 260 and/or 261, carry out the functions of the disclosed embodiments. The program logic may be delivered to the writeable RAM, PROMS, flash memory devices, etc. 262 of the Bluetooth LE advertiser device and the Bluetooth LE initiator/scanner device from a computer program product or article of manufacture in the form of computer-usable media such as resident memory devices, smart cards or other removable memory devices, as illustrated in FIG. 5. Alternately, they may be embodied as integrated circuit logic in the form of programmed logic arrays or custom designed application specific integrated circuits (ASIC). The Bluetooth radio 208 in the each of the Bluetooth LE advertiser device and the Bluetooth LE initiator/scanner device may be separate transceiver circuits or alternately, the radio 208 may be a single radio module capable of handling one or multiple channels in a high speed, time and frequency multiplexed manner in response to the processor 220. The program code for instructing the apparatus to perform its various operations may be stored in computer readable media, for example magnetic disks, CD ROMS, or flash memory devices. The program code may be downloaded from such computer readable media to be stored for example in the RAM 262 or programmable ROM 264 of the first Bluetooth LE advertiser device and the second Bluetooth LE initiator/scanner device for execution of the program code for example by the CPUs 260 and/or 261.

In accordance with an example embodiment of the invention, the processor 220 in the advertiser device 100A creates operating parameters for a wireless data channel connection and a description of a time interval available to the apparatus for transmission of advertising channel messages and a count of a number of previous transmissions of the advertising channel messages. The advertiser device 100A transmits the contents of its advertising channel packet buffer 142, the advertising channel packet 140, to the initiator/scanner devices 100D, 100E, and 100F, that have been in a scanning mode. When the initiator/scanner device 100E has received the advertising channel packet 140, it is buffered in its advertising channel packet buffer 142 for processing by its processor 220.

In an example embodiment of the invention, the Bluetooth LE advertiser device 100A and the Bluetooth LE initiator/scanner device 100E may be any of a variety of wireless personal area, wireless local area, or wireless wide area radio devices, such as Land Mobile Radio, Professional Mobile Radio, DECT (Digital Enhanced Cordless Telecommunications), 1G, 2G, 3G, 4G Cellular systems, IrDA, RFID (Radio Frequency Identification), Wireless USB, DSRC (Dedicated Short Range Communications), Near Field Communication, wireless sensor networks, ZigBee, EnOcean; Bluetooth, TransferJet, Ultra-wideband (UWB from WiMedia Alliance), WLAN, IEEE 802.11, WiFi, HiperLAN, Wireless Metropolitan Area Networks (WMAN) and Broadband Fixed Access (BWA) (LMDS, WiMAX, AIDAAS and HiperMAN), or the like.

Figure 3:
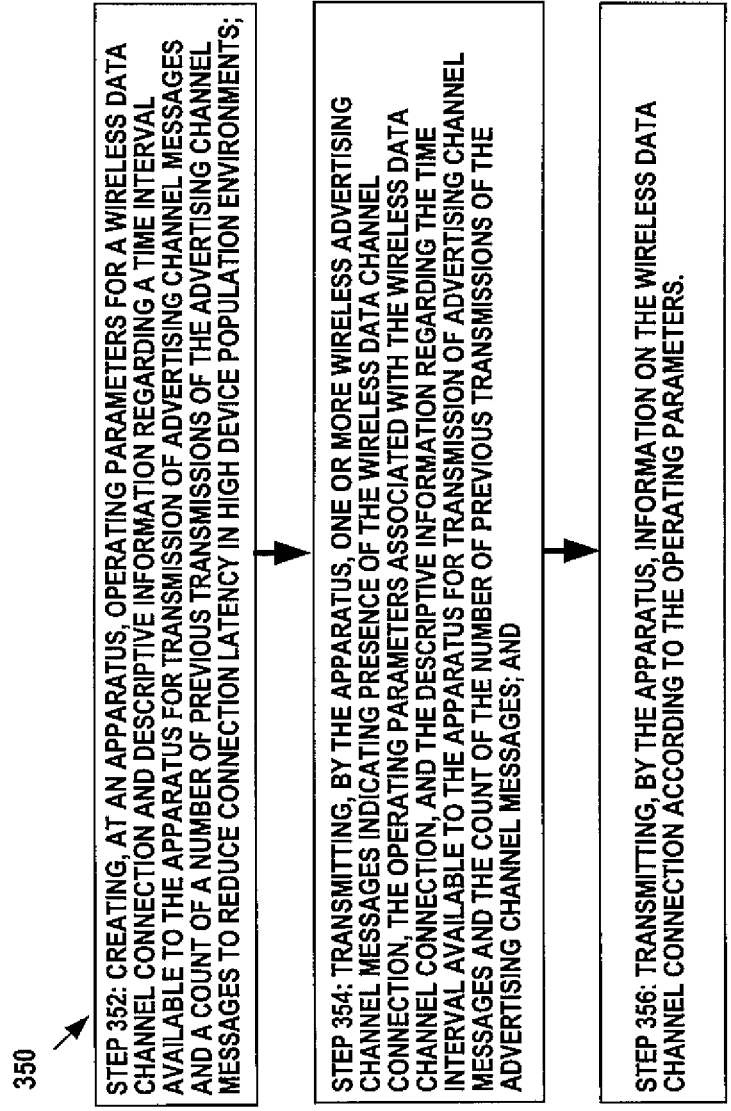
FIG. 3 is an example embodiment of a flow diagram of a method, from the point of view of advertiser device, in accordance with an example embodiment of the invention.

FIG. 3 is an example embodiment of a flow diagram 350 of a method, from the point of view of advertiser device, according to at least one embodiment. The steps of the flow diagram represent computer code instructions stored in the RAM and/or ROM memory, which when executed by the central processing units (CPU) CPU1 and/or CPU2, carry out the functions of the example embodiments of the invention. The steps may be carried out in another order than shown and individual steps may be combined or separated into component steps. The flow diagram has the following steps:

Step 352: creating, at an apparatus, operating parameters for a wireless data channel connection and descriptive information regarding a time interval available to the apparatus for transmission of advertising channel messages and a count of a number of previous transmissions of the advertising channel messages to reduce connection latency in high device population environments;

Step 354: transmitting, by the apparatus, one or more wireless advertising channel messages indicating presence of the wireless data channel connection, the operating parameters associated with the wireless data channel connection, and the descriptive information regarding the time interval available to the apparatus for transmission of advertising channel messages and the count of the number of previous transmissions of the advertising channel messages; and Step 356: transmitting, by the apparatus, information on the wireless data channel connection according to the operating parameters.

Figure 4:
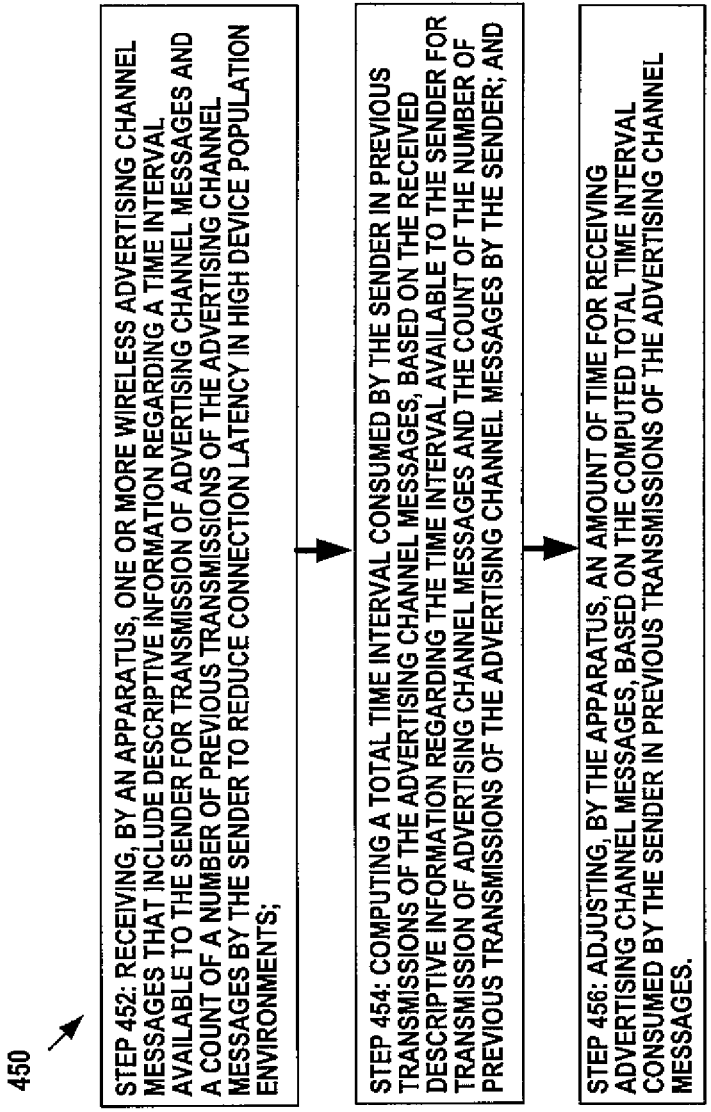
FIG. 4 is an example embodiment of a flow diagram of a method, from the point of view of the initiator/scanner device, in accordance with an example embodiment of the invention.

FIG. 4 is an example embodiment of a flow diagram 450 of a method, from the point of view of the initiator/scanner device, according to at least one embodiment. The steps of the flow diagram represent computer code instructions stored in the RAM and/or ROM memory, which when executed by the central processing units (CPU) CPU1 and/or CPU2, carry out the functions of the example embodiments of the invention. The steps may be carried out in another order than shown and individual steps may be combined or separated into component steps. The flow diagram has the following steps:

Step 452: receiving, by an apparatus, one or more wireless advertising channel messages that include descriptive information regarding a time interval available to the sender for transmission of advertising channel messages and a count of a number of previous transmissions of the advertising channel messages by the sender to reduce connection latency in high device population environments;

Step 454: computing a total time interval consumed by the sender in previous transmissions of the advertising channel messages, based on the received descriptive information regarding the time interval available to the sender for transmission of advertising channel messages and the count of the number of previous transmissions of the advertising channel messages by the sender; and Step 456: adjusting, by the apparatus, an amount of time for receiving advertising channel messages, based on the computed total time interval consumed by the sender in previous transmissions of the advertising channel messages.

FIG. 5 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hardwired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
   creating, at an apparatus, operating parameters for a wireless data channel connection and descriptive information regarding a time interval available to the apparatus for transmission of advertising channel messages and a count of a number of previous transmissions of the advertising channel messages to reduce connection latency in high device population environments;
   transmitting, by the apparatus, one or more wireless advertising channel messages indicating presence of the wireless data channel connection wherein the advertising channel messages are transmitted on a Bluetooth Low Energy advertising channel, the operating parameters associated with the wireless data channel connection, and the descriptive information regarding the time interval available to the apparatus for transmission of advertising channel messages and the count of the number of previous transmissions of the advertising channel messages; and
   transmitting, by the apparatus, information on the wireless data channel connection according to the operating parameters.

2. The method of claim 1, wherein the wireless advertising channel messages are transmitted on a Bluetooth Low Energy advertising channel and messages transmitted on the wireless data channel connection are transmitted on a Bluetooth Low Energy data channel.

3. The method of claim 1, wherein the wireless advertising channel message includes an advInterval value indicating the time interval available to the apparatus for transmission of advertising channel messages.

4. The method of claim 1, further comprising:
   entering, by the apparatus, a connected state with another device responding to the advertising channel messages; and
   resetting, by the apparatus, the count of the number of previous transmissions of the advertising channel messages, after the apparatus enters the connected state.

5. The method of claim 1, wherein the operating parameters included in the wireless advertising channel messages enable a receiving device to receive the descriptive information transmitted on the wireless data channel connection.

6. A method, comprising:
   receiving, by an apparatus, one or more wireless advertising channel messages that include descriptive information regarding a time interval available to a sender for transmission of advertising channel messages and a count of a number of previous transmissions of the advertising channel messages by the sender to reduce connection latency in high device population environments, wherein the advertising channel messages are transmitted on a Bluetooth Low Energy advertising channel;
   computing a total time interval consumed by the sender in previous transmissions of the advertising channel messages, based on the received descriptive information regarding the time interval available to the sender for transmission of advertising channel messages and the count of the number of previous transmissions of the advertising channel messages by the sender; and
   adjusting, by the apparatus, an amount of time for receiving advertising channel messages, based on the computed total time interval consumed by the sender in previous transmissions of the advertising channel messages.

7. The method of claim 6, wherein the amount of time for the apparatus receiving advertising channel messages is based on a scanWindow duration and a scanInterval; and
   the scanWindow is increased if the computed total time interval is less than the scanInterval and greater than the scanWindow.

8. The method of claim 6, wherein the amount of time for the apparatus receiving advertising channel messages is based on a scanWindow duration and a scanInterval; and
   the scanWindow duration is increased and the scanInterval is decreased if the computed total time interval is greater than the scanInterval.

9. The method of claim 6, wherein the amount of time for the apparatus receiving advertising channel messages is based on a scanWindow duration and a scanInterval; and
   either the scanWindow duration is decreased or the scanInterval is increased if the computed total time interval is less than the scanInterval.

10. The method of claim 6, wherein the wireless advertising channel messages are received on a Bluetooth Low Energy advertising channel.

11. An apparatus, comprising:
    at least one processor;
    at least one memory including computer program code;
    the at least one memory and the computer program code configured to, with the at least one processor, cause the apparatus at least to:
    create operating parameters for a wireless data channel connection and descriptive information regarding a time interval available to the apparatus for transmission of advertising channel messages and a count of a number of previous transmissions of the advertising channel messages to reduce connection latency in high device population environments, wherein the advertising channel messages are transmitted on a Bluetooth Low Energy advertising channel;
    transmit one or more wireless advertising channel messages indicating presence of the wireless data channel connection, the operating parameters associated with the wireless data channel connection, and the descriptive information regarding the time interval available to the apparatus for transmission of advertising channel messages and the count of the number of previous transmissions of the advertising channel messages; and
    transmit information on the wireless data channel connection according to the operating parameters.

12. The apparatus of claim 11, wherein the wireless advertising channel messages are transmitted on a Bluetooth Low Energy advertising channel and messages transmitted on the wireless data channel connection are transmitted on a Bluetooth Low Energy data channel.

13. The apparatus of claim 11, wherein the wireless advertising channel message includes an advInterval value indicating the time interval available to the apparatus for transmission of advertising channel messages.

14. The apparatus of claim 11, further comprising:
    the at least one memory and the computer program code configured to, with the at least one processor, cause the apparatus at least to:
    enter a connected state with another device responding to the advertising channel messages; and
    reset the count of the number of previous transmissions of the advertising channel messages, after the apparatus enters the connected state.

15. The apparatus of claim 11, wherein the operating parameters included in the wireless advertising channel messages enable a receiving device to receive the descriptive information transmitted on the wireless data channel connection.

16. An apparatus, comprising:
- at least one processor;
- at least one memory including computer program code;
- the at least one memory and the computer program code configured to, with the at least one processor, cause the apparatus at least to:
- receive one or more wireless advertising channel messages that include descriptive information regarding a time interval available to a sender for transmission of advertising channel messages and a count of a number of previous transmissions of the advertising channel messages by the sender to reduce connection latency in high device population environments, wherein the advertising channel messages are transmitted on a Bluetooth Low Energy advertising channel;
- compute a total time interval consumed by the sender in previous transmissions of the advertising channel messages, based on the received descriptive information regarding the time interval available to the sender for transmission of advertising channel messages and the count of the number of previous transmissions of the advertising channel messages by the sender; and
- adjust an amount of time for receiving advertising channel messages, based on the computed total time interval consumed by the sender in previous transmissions of the advertising channel messages.

17. The apparatus of claim 16, wherein the amount of time for the apparatus receiving advertising channel messages is based on a scanWindow duration and a scanInterval; and
- the scanWindow is increased if the computed total time interval is less than the scanInterval and greater than the scanWindow.

18. The apparatus of claim 16, wherein the amount of time for the apparatus receiving advertising channel messages is based on a scanWindow duration and a scanInterval; and
- the scanWindow duration is increased and the scanInterval is decreased if the computed total time interval is greater than the scanInterval.

19. The apparatus of claim 16, wherein the amount of time for the apparatus receiving advertising channel messages is based on a scanWindow duration and a scanInterval; and
- either the scanWindow duration is decreased or the scanInterval is increased if the computed total time interval is less than the scanInterval.

20. The apparatus of claim 16, wherein the wireless advertising channel messages are received on a Bluetooth Low Energy advertising channel.

21. A computer program product comprising computer executable program code recorded on a computer readable non-transitory storage medium, the computer executable program code comprising:
- code for creating, at an apparatus, operating parameters for a wireless data channel connection and descriptive information regarding a time interval available to the apparatus for transmission of advertising channel messages and a count of a number of previous transmissions of the advertising channel messages to reduce connection latency in high device population environments, wherein the advertising channel messages are transmitted on a Bluetooth Low Energy advertising channel;
- code for transmitting, by the apparatus, one or more wireless advertising channel messages indicating presence of the wireless data channel connection, the operating parameters associated with the wireless data channel connection, and the descriptive information regarding the time interval available to the apparatus for transmission of advertising channel messages and the count of the number of previous transmissions of the advertising channel messages; and
- code for transmitting, by the apparatus, information on the wireless data channel connection according to the operating parameters.

22. A computer program product comprising computer executable program code recorded on a computer readable non-transitory storage medium, the computer executable program code comprising:
- code for receiving, by an apparatus, one or more wireless advertising channel messages that include descriptive information regarding a time interval available to a sender for transmission of advertising channel messages and a count of a number of previous transmissions of the advertising channel messages by the sender to reduce connection latency in high device population environments, wherein the advertising channel messages are transmitted on a Bluetooth Low Energy advertising channel;
- code for computing a total time interval consumed by the sender in previous transmissions of the advertising channel messages, based on the received descriptive information regarding the time interval available to the sender for transmission of advertising channel messages and the count of the number of previous transmissions of the advertising channel messages by the sender; and
- code for adjusting, by the apparatus, an amount of time for receiving advertising channel messages, based on the computed total time interval consumed by the sender in previous transmissions of the advertising channel messages.

* * * * *